April 1, 1941.  F. M. DARNER ET AL  2,236,707
BRUSH SUPPORTING AND OPERATING MECHANISM FOR
WELDING MACHINES AND THE LIKE
Filed March 31, 1939    3 Sheets-Sheet 1

INVENTORS
ROBERT A. SHRYOCK
FREDERIC M. DARNER
BY
Richey & Watts
ATTORNEYS

April 1, 1941.  F. M. DARNER ET AL  2,236,707
BRUSH SUPPORTING AND OPERATING MECHANISM FOR
WELDING MACHINES AND THE LIKE
Filed March 31, 1939  3 Sheets-Sheet 2

INVENTORS
ROBERT A. SHRYOCK
& FREDERIC M. DARNER
BY
Richey & Watts
ATTORNEYS

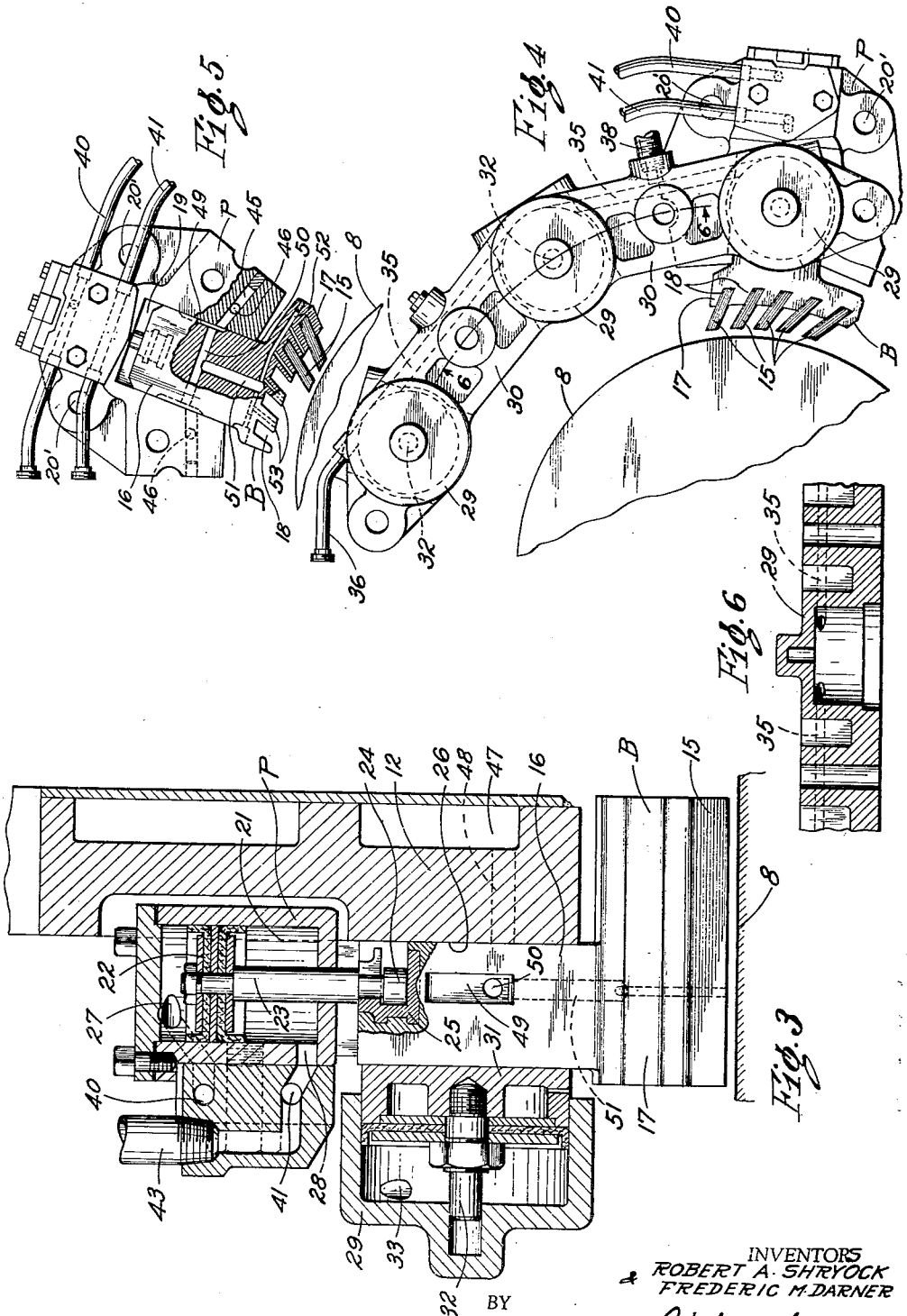

Patented Apr. 1, 1941

2,236,707

UNITED STATES PATENT OFFICE 2,236,707

BRUSH SUPPORTING AND OPERATING MECHANISM FOR WELDING MACHINES AND THE LIKE

Frederic M. Darner, Shaker Heights, and Robert A. Shryock, Elyria, Ohio, assignors, by mesne assignments, to Republic Steel Corporation, Cleveland, Ohio, a corporation of New Jersey Application March 31, 1939, Serial No. 265,198

9 Claims. (Cl. 219—4)

This invention relates to means for establishing electrical contact between relatively moving parts and more particularly to improved means for conducting the welding current from the terminals of an electrical circuit to the rotating electrodes of an electrical tube or pipe welding machine.

In the manufacture of electrically welded tubing it is well known to cause a high current to flow across the abutting edges of a pre-formed tube at relatively low voltage. The current may be applied to the tube by a pair of roller electrodes which contact the tube on opposite sides of the seam, one of the roller electrodes being connected to one side of the current supply and the other electrode being connected to the other side of the current supply. Due to the heavy current employed, the problem of conducting the current to the rotating electrodes is a serious one. It has been found that an effective contact may be obtained between the rotating electrodes and the current source by providing drum shaped flanges on the electrodes which are engaged by a plurality of brushes disposed circumferentially around the flanges. Prior to our invention these brushes have been secured in holders and a plurality of these holders disposed around the contact drum or roller electrode. Adjusting screws and bolts of various types have been employed to give the proper contact between the brushes and the electrode drum and to secure the holders to the electrical terminals. With such arrangements, however, considerable difficulty has been encountered in obtaining the same or uniform pressure between the sets of brushes carried by the individually adjustable brush holders. If even pressure is not obtained the brushes having the heaviest pressure carry the most current and those having light pressure carry less current. This unequal distribution of current tends to cause burning of the brushes and pitting of the contact drum.

In the operation of welding machines of the type referred to it is necessary to change electrodes for different sizes of tube or pipe and, at intervals, to remove and replace the brushes due to wear, etc., and also it is necessary to re-face or re-surface the contacting drums on the electrodes. In modern welding machines means may be provided for accomplishing this re-surfacing of the drums without removing the electrodes from the machine but merely moving the brushes out of contact and engaging the drum with a surfacing tool while driving the electrode. Where the bolt and screw type of brush holder support has been used a great deal of labor and time is involved in removing and replacing the brushes, either to change a set of brushes or to dress the electrode drums. Further, every time the brushes are moved out of adjustment with the drum the tedious and difficult job of resetting each individual holder to give equal brush contact must be repeated.

It is among the objects of our invention to provide means for causing a good electrical connection between relatively moving parts whereby the brushes which furnish the direct contact may all be simultaneously and practically instantaneously lifted out of contact with the moving part and simultaneously and practically instantaneously caused to re-engage the moving member with substantially equal pressure on each brush and with excellent electrical contact throughout. Other objects of our invention are the provision of means for supporting the brushes around the circumference of a rotating electrode having a drum contacting surface, the brushes being secured in groups in brush holders and a plurality of brush holders being spaced circumferentially around the electrode, whereby the brush holders may be supported from the current carrying conductor or terminal and may be caused to engage the conducting support or be released from good electrical engagement therewith and may also instantaneously and simultaneously be caused to be moved toward the electrode drum with substantially exactly the same pressure; the provision of a welding machine having a transformer and rotatable electrodes supported therebelow and having a plurality of brushes secured in a plurality of brush holders together with fluid pressure actuated means for moving said brush holders toward or away from the electrode and locking or releasing said brush holders in electrode engaging position; the provision of supports for a plurality of brush holders in a welding machine whereby the equal brush engaging pressure can be obtained on each holder and the brushes can be moved into and out of engagement with the electrode instantaneously and as frequently as desired without changing the even pressure between brushes and electrodes and regardless of variations in wear of the brushes; the provision of a simple and effective brush support for tube or pipe welding machines whereby all manual adjustment of the brush pressure is eliminated and the same pressure is automatically obtained on all brushes; the provision of a welding machine whereby the brushes can be moved out of contact with the electrodes, the electrode contacting surfaces dressed and the brushes returned to contact therewith without manual adjustment and with the same pressure on all brushes; the provision of a brush holder and brushes of the type described which are adapted to be maintained at the proper temperature whereby annealing of some of the brushes with resultant failure thereof is eliminated.

The above and other objects of our invention will appear from the following description of a preferred embodiment thereof, reference being had to the accompanying drawings, in which—

Figure 3 is an enlarged vertical cross-sectional view showing the brush holder supporting and operating mechanism.

Figure 4 is a detached fragmentary side elevation of one half of the brush holder support including the push-up cylinders and the locking cylinders.

Figure 5 is a detached fragmentary view, partly in section, showing a brush holder and its support on the push-up cylinder.

Figure 6 is a cross-sectional view taken on line 6—6 of Figure 4 illustrating a locking cylinder.

Figure 1:
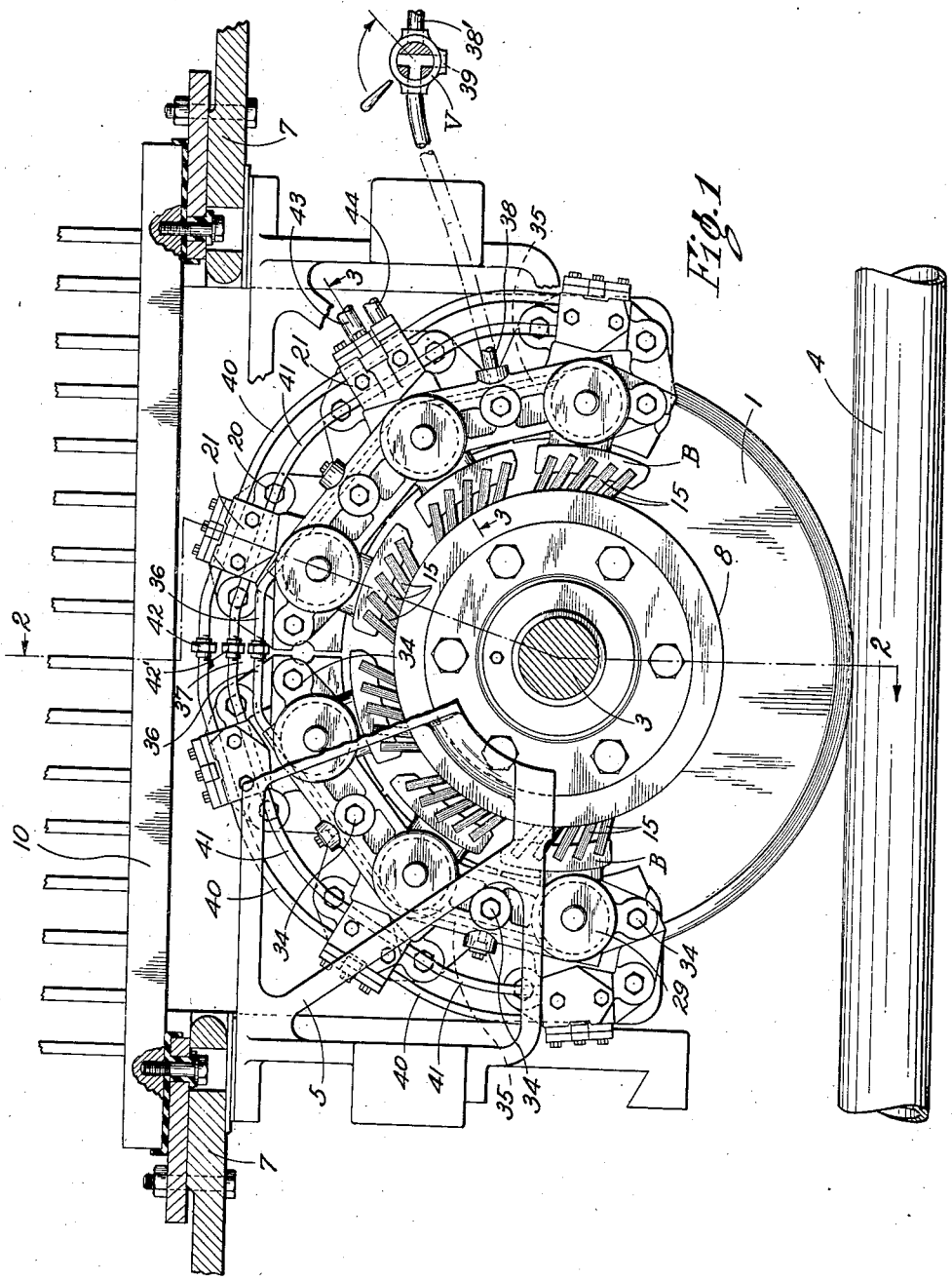
Figure 1 is a fragmentary side elevation, taken on line 1—1 of Figure 2, of a welding machine of the type described incorporating our improved brush supporting mechanism.
Figure 2:
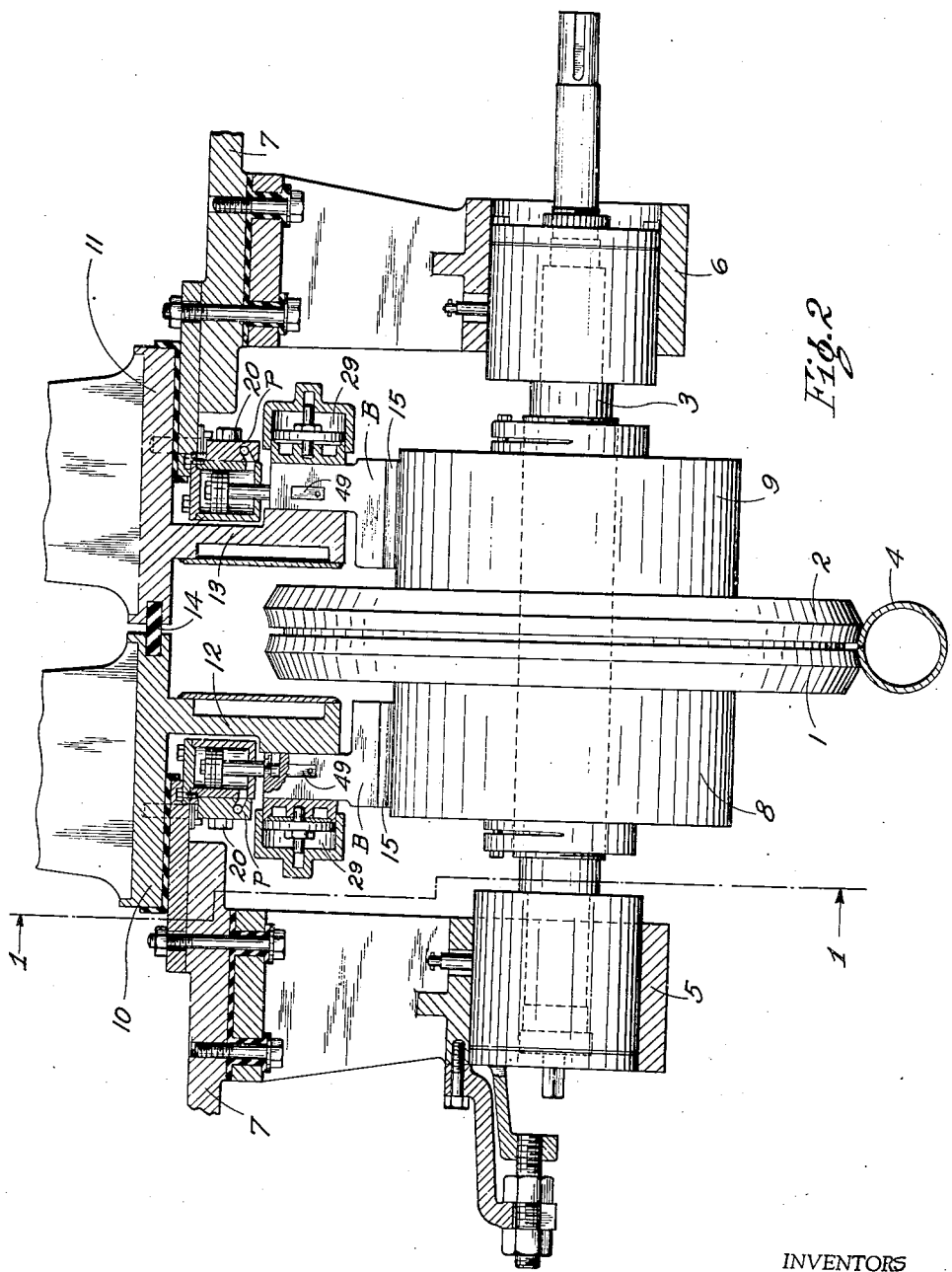
Figure 2 is a vertical cross-sectional view taken on line 2—2 of Figure 1.

As is best seen in Figures 1 and 2, the welding machine to which our invention is applied includes a pair of grooved electrodes 1 and 2 which are mounted on a single shaft 3 and which are, of course, suitably insulated from each other. The grooved peripheries of the electrodes 1 and 2 engage the tube 4 on opposite sides of the seam therein. Bearing brackets 5 and 6 are mounted on the frame member 7 and are fully insulated therefrom, as is seen in Figure 2. The electrodes 1 and 2 have drum contacting surfaces 8 and 9 respectively which may be formed by annular flanges extending out from the disc electrode members 1 and 2. The frame member 7 is secured to and insulated from the transformer secondary members 10 and 11. The member 10 has a downwardly projecting terminal and brush supporting flange 12 and the member 11 has a similar flange 13. An insulating spacer 14 serves to prevent contact between the two sides of the secondary circuit and the flanges 12 and 13 project down below the center of the shaft 3 (see Fig. 1) and have generally semi-circular apertures which fit around and are spaced from the contact drums 8 and 9. The outer faces of the flanges 12 and 13 are preferably given a high finish to permit of good electrical contact with the brush holders as will be later described. The electrical connections from the flanges 12 and 13 to the contact drums 8 and 9 are completed by a plurality of brushes 15 preferably of laminated bronze or the like. These brushes, in the form of our invention illustrated, are secured in groups of five in sliding brush holders generally indicated at B. There are six brush holders B spaced around a portion of the circumference of each of the electrode contact drums 8 and 9 and as the supporting and operating mechanism for each brush holder B and the brushes carried thereby is substantially the same as each of the others, it will be sufficient to describe in detail only one of these brush supporting and operating mechanisms and to explain the manner in which all of the brush holders are interconnected for simultaneous operation.

As is best seen in Figures 3 to 6, each brush holder B comprises a rectangular stem 16 with an arcuate brush supporting flange 17 at the bottom thereof. The flange 17 is provided with angle slots 18 in each of which is secured a laminated brush 15. Any suitable means may be employed for securing the brushes 15 in the slots 18 and the end faces of the brushes are, of course, contoured to fit the circumference of the contact drum with which they engage. The rectangular shank portion 16 of the holder B has a sliding fit in a slot 19 in the push-up cylinder housing generally indicated at P (see Figs. 4 and 5). The housing P is secured to the secondary terminal flange 12 by suitable screws 20 (Fig. 1) which extend through holes 20' in the housing. A cylinder 21 is formed in the housing P and carries a piston 22 having a piston rod 23 which extends out into the groove 19 and is provided with a flanged head 24. As may be most clearly seen in Figure 3, the shank 16 of the brush holder B carries a wear resisting insert 25 at its upper end and this wear resisting insert is formed with a T-slot which slips over the head 24 of the piston rod 23. Thus, it will be seen that the holder B, together with its brushes, may be freely slipped off and on over the headed end of the piston rod 23. The inner face 26 of the stem or shank 16 is preferably given a highly polished finish so that it may be caused to engage the similarly polished outer surface of the flange 12 with good electrical contact.

Each cylinder 21 is provided with a push-up or inlet port 27 and a release or retracting port 28. These are connected to a suitable source of fluid under pressure in a manner which will be later described and it will be seen that, when fluid pressure is applied to the piston 22 through the port 27, the piston 22, piston rod 23 and brush holder B will be pushed toward the electrode contact drum 8 and the brushes 15 will be caused to engage therewith. When the port 27 is connected to exhaust and the port 28 is connected to a source of fluid pressure the piston 22 will be moved upwardly and, because of the T-slot connection with the shank 26 of the holder B, will lift the brush holder B and the brushes 15 away from and out of contact with the drum surface 8, as is seen in Figures 3, 4 and 5.

In order to releasably obtain the necessary contact pressure between the face 26 of the brush holder B and the outer face of the flange 12 we provide locking cylinders 29. Preferably three of these cylinders 29 are formed in a single casting and are interconnected by the connecting webs 30. Each cylinder 29 carries a locking piston 31 having a guide stem or rod 32 engaging a suitable bore in the end of the cylinder 29 (see Fig. 3). When fluid pressure is applied to the cylinder 29 through the port 33 the piston 31, which projects out beyond the end of the cylinder 29, pushes against the outer face of the shank 16 of the brush holder with sufficient pressure to establish good electrical contact between the surface 26 and the outer surface of the transformer secondary flange 12 and also to lock the brush holder firmly in position. As is evident from Figure 1, the push-up cylinder housings P are individual units which are secured to the flanges 12 and 13 as described above. The two castings each of which carries three locking or contacting cylinders 29, are also secured to the flanges 12 and 13 by suitable screws 34 which extend through holes in the housing P into the secondary flanges 12 and 13. Interconnecting fluid pressure conduits 35 extend through the webs 30 and connect the three cylinders 29 of each group together and in the assembled apparatus, as seen in Figure 1, connecting pipes 36 are joined by suitable couplings 37 between the two locking cylinder castings whereby all six of the cylinders 29 on each secondary terminal are interconnected. A pipe 38 connects into one of the conduits 35, as seen in Figure 1, and extends through a control valve, as illustrated the three-way valve V, to a suitable source of fluid under pressure such as compressed air.

When the valve V is in the position shown in Figure 1, the pipe 38 is shut off from the supply line 38' and the cylinders 29 are each connected to the atmosphere through the vent opening 39 in the housing of the valve V. Thus, when in this position no pressure will be exerted against the shank 16 of the brush holder B and they may be freely moved toward or away from the adjacent contact drum 8 or 9. When the valve V is turned through 90° in the direction indicated by the arrow in Figure 1, the atmospheric connection is shut off and the pipe 38 is connected to the source of pressure. This pressure will be transmitted practically instantaneously to each of the cylinders 29 and, as each of these cylinders is of the same area, the pistons 31 will all be caused to exert substantially the same force against the shanks 16 of the brush holders and move them into electrical contact with the supporting transformer secondary flange and will also firmly lock them in position against movement either toward or away from the electrode contact drum.

The twelve push-up cylinders 21 are substantially identical and are provided with similar ports 27 and 28. Considering one side only of the machine, the six cylinders 21 are interconnected by pipes 40 and 41, couplings 42 and 42' being preferably employed between the two center cylinders 21 to facilitate assembly and disassembly of the apparatus. Pressure supply pipes 43 and 44 connect to the pipes 40 and 41 respectively. These supply pipes are seen in Figure 1 and extend to a suitable valve, not shown, whereby pressure may be applied through either one of these pipes and the other connected to the atmosphere, the valve being adapted to reverse these connections at will, so that, when pressure is applied through the pipes 44 and 40 the pistons 22 and the brush holders B will be moved toward the electrodes and, when the pipes 44 and 40 are connected to the atmosphere and pipes 43 and 41 are connected to the source of fluid pressure, the pistons 22 will move upwardly lifting the brush holders B and the brushes 15 from the contact drums 8 or 9 and out of electrical contact therewith. As each brush holder B carries the same number of brushes and as they are all disposed substantially radially relative to the rotating electrodes, and as the cylinders 21 and pistons 22 are all of the same size it will be seen that, when pressure is applied to the tops of the cylinders 21, each brush holder B will be caused to engage the electrode drum with approximately the same total pressure and, as the ends of the brushes 15 are contoured to fit the electrode contact drum, all of the brushes will have the same contact pressure against the electrode.

In the operation of our improved brush support, referring only to one side of the machine, i. e., one electrode secondary terminal and one electrode, and assuming that the brushes 15 are in working engagement with the electrode contact drum, the fluid pressure will be applied to the pistons 29 in the cylinders 29 to lock the brushes in position and establish good electrical contact between the brush holders and the source of current. Now, if it is desired to remove the brushes out of contact with the electrode it is only necessary to turn the valve V to release the pressure in the cylinders 29 and turn the pressure on through the pipe 43 so that it will be effective against the undersides of the pistons 22 simultaneously and instantaneously to lift the brush holders and the brushes carried thereby out of contact with the electrode drum. When it is desired to re-establish working contact of the brushes and electrodes the control valve for the push-up cylinders 21 will be turned to cause the fluid pressure to be applied through the pipes 44 and 40 and the port 27, whereupon all of the brush holders will be immediately moved down to cause the brushes 15 to engage the electrode drum with equal pressure. After this operation is completed the valve V will be turned to apply fluid pressure through the pipe 38 and the connecting conduits 35 to each of the cylinders 29 whereupon each brush holder will be firmly locked in good electrical contact against the transformer secondary flange. Even though the pressure on the push-up cylinders 21 may now vary or fall off the same brush pressure will be maintained against the electrode due to the locking action of the cylinders 29 and pistons 31.

When it is desired to change any brush holder B and the brushes carried thereby it is only necessary to remove the proper casting which carries the locking cylinders 29 whereupon the brush holder can be slipped off from the headed end 24 of the piston rod 23 and replaced by another holder and set of brushes. When the apparatus is re-assembled the new set of brushes will be caused to engage the electrode with exactly the same pressure as the other sets, thus all difficulty of securing even contact of all the brushes is eliminated. The operation of moving the brushes away from the electrode in order to permit cleaning or dressing of the surface of the drums 8 and 9 is accomplished by the mere turning of the control valves. Likewise, the electrodes may be completely removed and a new electrode put in position, as for example, when it is desired to change from one tube size to another, without removing the brush holding mechanism. When the electrode is replaced proper and even brush contact on both of the electrode contact drums may immediately be obtained by merely manipulating the control valves, as described above. The brush pressure may be varied by varying the fluid pressure supplied through the pipe 44 and, when the same fluid pressure is used the operator may be assured that he will obtain the same brush contact pressure regardless of how many times the brushes are moved into or out of engagement with the electrodes.

Another feature of our invention, which is best illustrated in Figure 5, is the adaptability of our improved brush support to the water cooling of the brush holders and brushes. In tube welders of the type illustrated, if one set of brushes becomes overheated, it may become annealed and softened to such an extent that it will not function properly. Prior to our invention water has been utilized and has been directed over and around the brushes to keep them cool. However, difficulty has been experienced in evenly distributing the water to insure that all of the brushes will be kept below the danger point. In our present invention, as is seen in Figure 5, the push-up cylinder housings P are provided with holes 45 and connecting holes 46. The transformer secondary flanges 12 and 13 are provided with water jackets 47 (Fig. 3) and are supplied with water from any suitable source, not shown. Holes 48 extend from the jackets 47 to the outer surface of the transformer flanges 12 and 13 and, in the assembled apparatus, are aligned with holes 46 of the housings P. Thus, water under pressure from the jacket 47 passes through the holes 46 into the holes 45 which connect with the slots 19. Grooves 49 are formed on the sides of the shanks 16 of the brush holders and holes 50 extend inwardly from the grooves 49 connecting with longitudinal passages 51 which in turn connect to other transverse passages 52. From the transverse passages 52 holes extend through the teeth portions 53 of the brush holders so that water which enters the holders through the slots 49 will be directed out between each of the brushes 15 thus assuring a uniform supply of cooling water over each brush and eliminating the possibility of any one brush or set of brushes becoming overheated. By providing the elongated connecting slots 49 it will be seen that the water connection to the brushes is maintained regardless of whether the brushes are in working or retracted position and regardless of the degree of wear of the brushes.

Although we have illustrated and described our improved brush holding and supporting mechanism in connection with a welding machine having disc electrodes mounted on the same shaft, it will be understood by those skilled in the art that our invention is equally adaptable for other types of electrode arrangements, as for example where the electrode shafts are separate and disposed at an angle to each other or where the electrodes are mounted on vertical axes rather than horizontal. Further, although we have described the illustrated embodiment of our invention in considerable detail it will be understood by those skilled in the art that numerous variations and modifications may be made in the structure and arrangement of parts employed without departing from the spirit of our invention, and we do not, therefore, wish to be limited to the particular structure herein shown and described, but claim as our invention all embodiments thereof coming within the scope of the appended claims.

We claim:

1. Brush supporting and operating mechanism of the type described including a brush holder, fluid pressure actuated means for moving said holder toward and away from one machine element with which contact is to be made and independently operable fluid pressure actuated means for positively locking said holder in contacting position against movement toward or away from said machine element.

2. In apparatus of the type described, a terminal member, a rotatable member having a contact surface, a brush holder, a brush carried by said holder, a brush holder guide, said brush holder having a sliding fit in said guide and having one surface adjacent a surface of said terminal member, fluid pressure actuated means for moving said holder and brush in said guide toward and away from said contact surface, and independently operable fluid pressure actuated means for exerting contacting and positive locking pressure between said holder and said adjacent surface of said terminal member.

3. In combination an electrical terminal member, a rotatable member, a brush holder, a push-up cylinder carried by said terminal member, a push-up piston in said push-up cylinder, means for detachably connecting said brush holder to said piston, a locking cylinder carried by said terminal member, a locking piston in said locking cylinder, said locking piston being positioned to exert a force against said brush holder tending to cause said brush holder to engage and be locked against said terminal member, valve means and fluid pressure conducting connections whereby the operation of said push-up piston may be controlled to move said brush holder toward and away from said rotatable member, and valve means and fluid pressure conducting connections whereby locking pressure may be applied to and released from said locking cylinder.

4. In combination, a rotatable member, an electrical terminal adjacent said rotatable member, a brush holder, a brush carried by said holder, fluid pressure actuated means for moving said holder and brush to make and break electrical contact between said brush and said rotatable member, and independently operable fluid pressure actuated means for positively locking said holder against said electrical terminal.

5. In apparatus of the type described the combination of an electrical terminal member, a rotatable member, a plurality of brush holders, brushes carried by each of said holders, independent fluid pressure actuated means for moving each of said holders and the brushes carried thereby toward and away from said member, fluid pressure conducting means interconnecting said fluid pressure actuated means, and means for controlling the flow of fluid under pressure to said fluid pressure actuated means.

6. In apparatus of the type described the combination of an electrical terminal member, a rotatable member, a plurality of brush holders, brushes carried by each of said holders, independent fluid pressure actuated means for moving each of said holders and the brushes carried thereby toward and away from said rotatable member, fluid pressure conducting means interconnecting said fluid pressure actuated means, means for controlling the flow of fluid under pressure to said fluid pressure actuated means, other fluid pressure actuated means for maintaining said holders firmly locked against said terminal member, fluid pressure conducting connections interconnecting said other fluid pressure actuated means, and means for controlling the application of fluid pressure to said other fluid pressure actuated means.

7. In combination, a brush holder of the type described having a shank portion and a slotted brush holding portion and a cooling water passage having an inlet opening in said shank and discharge outlets adjacent the brush slots, and a housing slidably supporting said shank of said brush holder, said housing having cooling water passages including an outlet communicating with said inlet in said shank.

8. In combination, a brush holder of the type described having a shank portion and a slotted brush holding portion and a cooling water passage having an inlet opening in said shank and discharge outlets adjacent the brush slots, a housing slidably supporting said shank of said brush holder, said housing having cooling water passages including an outlet communicating with said inlet in said shank, and fluid pressure actuated means for moving said holder toward and away from said housing.

9. In apparatus of the type described an electrical terminal member, a rotatable member, a brush holder having cooling water passages, a supporting housing having cooling water passages, means for slidably supporting said holder adjacent said terminal, fluid pressure actuated means for moving said holder toward and away from said rotatable member, means for supplying cooling water to said supporting housing, said water passages in said holder and said housing being adapted to maintain water conducting connections regardless of sliding movement of said holder.

ROBERT A. SHRYOCK.
FREDERIC M. DARNER.